(12) United States Patent
Humbert

(10) Patent No.: US 7,861,506 B2
(45) Date of Patent: Jan. 4, 2011

(54) ARRANGEMENT FOR THE ADJUSTMENT OF THE POSITION OF A TAKE UP DRUM AND A HOLD-DOWN OF AN AGRICULTURAL HARVESTING MACHINE

(75) Inventor: Clément Humbert, Boussieres (FR)

(73) Assignee: Deere & Company, Moline, IL (US)

( * ) Notice: Subject to any disclaimer, the term of this patent is extended or adjusted under 35 U.S.C. 154(b) by 140 days.

(21) Appl. No.: 12/324,097

(22) Filed: Nov. 26, 2008

(65) Prior Publication Data

US 2009/0139195 A1 Jun. 4, 2009

(30) Foreign Application Priority Data

Dec. 4, 2007 (DE) .................. 10 2007 058 313

(51) Int. Cl.
- A01D 39/00 (2006.01)
- A01D 43/02 (2006.01)
- A01D 75/00 (2006.01)

(52) U.S. Cl. .......................... 56/341; 100/88
(58) Field of Classification Search .............. 56/341, 56/364, 344, 10.7, 11.9; 100/88
See application file for complete search history.

(56) References Cited

U.S. PATENT DOCUMENTS

| | | | |
|---|---|---|---|
| 4,516,389 A | 5/1985 | Core | |
| 5,261,216 A * | 11/1993 | Schumacher et al. | 56/14.4 |
| 6,295,797 B1 * | 10/2001 | Naaktgeboren et al. | 56/364 |
| 6,594,978 B2 * | 7/2003 | Viaud | 56/10.2 E |
| 6,651,416 B2 * | 11/2003 | Trelstad et al. | 56/341 |
| 2006/0277888 A1 * | 12/2006 | Erdmann et al. | 56/344 |
| 2008/0264028 A1 * | 10/2008 | Woodford | 56/16.4 R |

FOREIGN PATENT DOCUMENTS

| | | |
|---|---|---|
| DE | 41 15 056 | 11/1992 |
| DE | 199 18 552 | 10/2000 |
| DE | 100 57 135 | 5/2002 |
| EP | 1 733 609 | 12/2006 |
| GB | 2 245 471 | 1/1992 |

OTHER PUBLICATIONS

European Search Report, 7 pages, Mar. 23, 2009.

* cited by examiner

Primary Examiner—Árpád Fábián-Kovács

(57) ABSTRACT

An arrangement is provided for the adjustment of the position of a take-up drum and a hold-down of an agricultural harvesting machine. A first actuator is arranged for the movement of the take-up drum relative to the harvesting machine between an operating position and a non-operating position, a second actuator arranged for the adjustment in height of the hold-down relative to the take-up drum and a control arrangement connected with the actuators. The control arrangement is designed to control the second actuator in the sense of a downward movement of the hold-down when it controls the first actuator to bring the take-up drum into the non-operating position.

8 Claims, 7 Drawing Sheets

ARRANGEMENT FOR THE ADJUSTMENT OF THE POSITION OF A TAKE UP DRUM AND A HOLD-DOWN OF AN AGRICULTURAL HARVESTING MACHINE

FIELD OF THE INVENTION

The invention concerns an arrangement for the adjustment of the position of a take-up drum and a hold-down of an agricultural harvesting machine. A first actuator is arranged for the movement of the take-up drum relative to the harvesting machine between an operating position and a non-operating position, and a second actuator is arranged for the height adjustment of the hold-down relative to the take-up drum. A control arrangement is connected with the actuators.

BACKGROUND OF THE INVENTION

Harvested crop take-up arrangements are used in agriculture both to take up harvested crop lying on a field that may have been dried previously and was deposited in a swath, and to conduct it to a harvesting machine in which it is: baled into a bale (baler), deposited (self-loading storage box), chopped (forage harvester) or threshed (combine). Usually such harvested crop take-up arrangements include take-up drums with tines attached to tine carriers extending transverse to the forward operating direction. The tine carriers are brought into motion in that they themselves or a central shaft connected to them is brought into rotation. The tine carriers are controlled by curved tracks or cam tracks or they may be uncontrolled. The tines extend outward through intervening spaces that remain between strippers attached to the frame of the take-up arrangement, and move along these intervening spaces.

Usually a so-called hold-down is arranged above the take-up drum which limits the movement of the harvested crop conveyed by the take-up drum in the forward and upward direction. Such hold-downs are configured, in the art, by flat sheet metal plates (DE 39 19 889 A) or arrangements with two or more rolls rotating freely or driven and arranged transverse to the forward operating direction (DE 39 22 695 A) or rolls with sheet metal plates following downstream connected in joints, free to pivot, or resilient tines (DE 101 20 124 A).

It has proven to be advantageous to configure the hold-down so that it can be raised by means of an active drive, in order to permit it to clear after a jam in the flow of harvested crop, so as to simplify the clearance of the harvested crop during a reverse operation. For this purpose a hydraulic cylinder is provided between the frame retaining the take-up drum and the hold-down. (EP 0 403 899 A, DE 199 18 552 A).

The take-up drum itself is coupled to the chassis of the harvesting machine, free to pivot, about a horizontal axis extending transverse to the forward operating direction and is guided across the ground at a constant height by means of support wheels or active actuators controlled by means of a ground distance sensor (see DE 41 15 056 A, DE 100 57 135 A or DE 299 22 193 U). For operation on public roads the take-up drum is pivoted upwards about the aforementioned axis by means of a hydraulic cylinder. In case that the hold-down is then in a raised position there is a danger that it could collide with some of the components of the harvesting machine, for example, the underside of the frame of the harvesting machine or a towbar by means of which it is coupled to a towing vehicle. Accordingly, the operator of the harvesting machine must watch that he/she lowers the hold-down before he/she raises the take-up drum, in order to avoid any damage to the hold-down or to the harvesting machine. This task is prone to error, particularly for inexperienced or tired operators.

SUMMARY OF THE INVENTION

The purpose underlying the invention is found in the need to make available an arrangement for the adjustment of the position of a take-up drum and a hold-down for an agricultural harvesting machine with which undesired collisions of the hold-down with other components of the harvesting machine are avoided.

An arrangement for the adjustment of the position of the take-up drum and the hold-down of an agricultural harvesting machine includes two actuators and a control arrangement connected to these. A first actuator is used to move the take-up drum relative to the harvesting machine between a lowered operating position and a raised non-operating position. A second actuator is provided for the adjustment of the height of the hold-down relative to the take-up drum. The control arrangement automatically controls the second actuator in the sense of a downward movement of the hold-down by movement of the first actuator in that it brings about the movement of the take-up drum into the non-operating position.

In this way the control arrangement automatically prevents the hold-down from colliding with any components of the harvesting machine when the take-up drum is brought into the non-operating position. The invention is also advantageous when no components of the harvesting machine are located above the hold-down, since the limit of the height that can be reached by the hold-down reduces the risk that it can collide with other obstacles such as branches of trees or injure any persons in the vicinity.

An obvious solution is for the control arrangement to control the second actuator prior to or simultaneously with the first actuator, here the second actuator controls the downward movement of the hold-down while the first actuator brings the take-up drum into the non-operating position.

In possible embodiments the first actuator is an electric motor or a hydraulic cylinder, while the second actuator could be configured as well as an electric motor or a hydraulic cylinder. The control arrangement may be connected to an input arrangement controlled by the operator of the harvesting machine which permits a combined control or separate controls of the two actuators, where the coupling of the downward movement of the hold-down with the upward movement of the take-up drum into the non-operating position, according to the invention, is provided.

BRIEF DESCRIPTION OF THE DRAWINGS

An embodiment of the invention is explained on the basis of the accompanying drawings wherein.

DESCRIPTION OF THE PREFERRED EMBODIMENT

Figure 1:
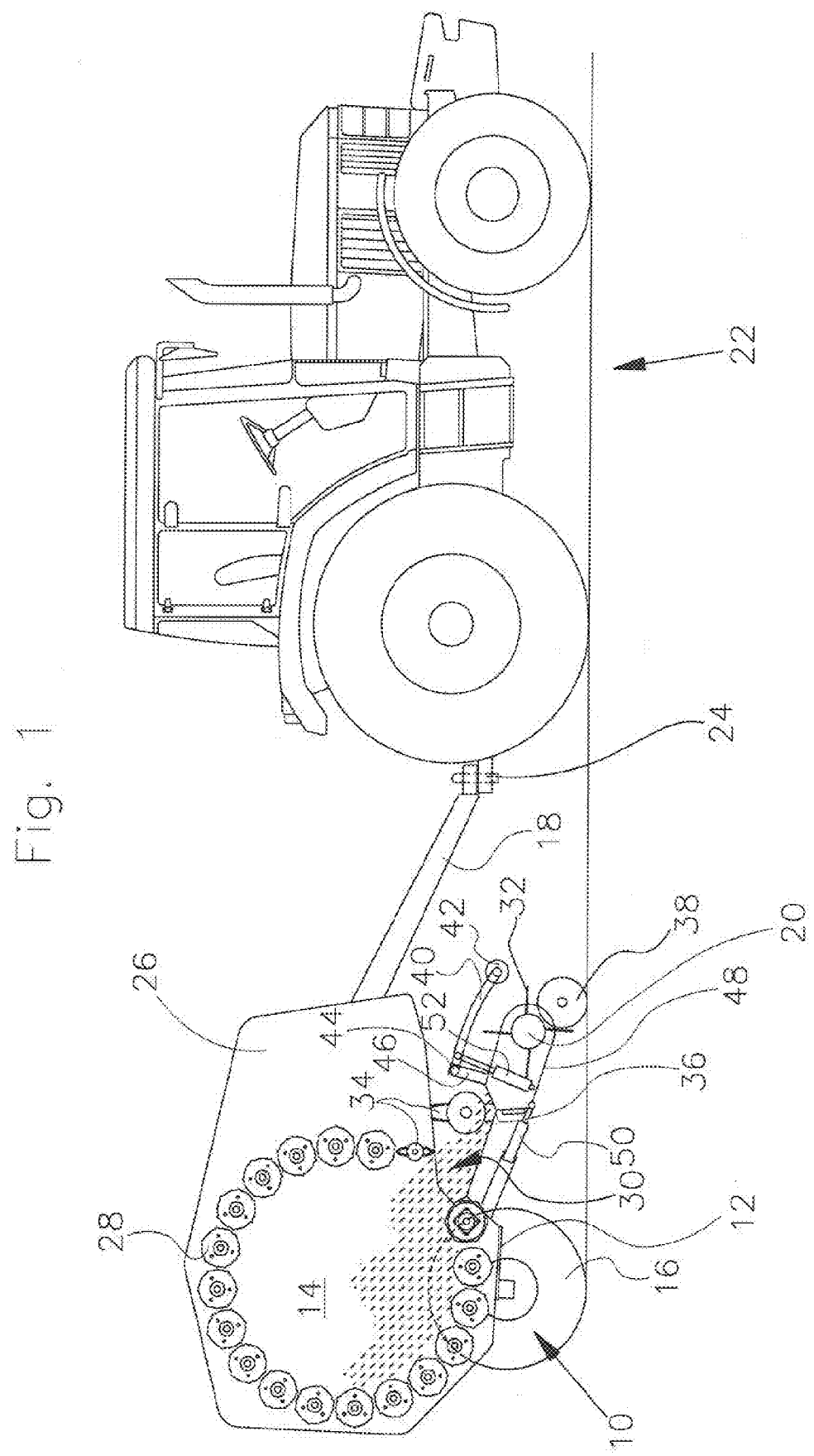
FIG. 1 is a schematic illustration of a harvesting machine equipped with an arrangement according to the invention and a tractor.

A towed harvesting machine 10 in the form of a baler is equipped with a chassis 12, a baling chamber 14, wheels 16, a towbar 18 and a take-up drum 20 and is towed by a towing vehicle 22 to whose rear coupling 24 the tow bar 18 is fastened. In the embodiment shown the harvesting machine 10 is configured as a round baler with a baling chamber 14 of fixed size. In its place another form of baler could be selected, for example, a round baler with a baling chamber of variable size, a slab baler, a large baler similar to the towed implement with a take-up arrangement 20.

The chassis 12 is formed as a weldment and carries side walls 26 between which roll-shaped baling elements 28 extend. The baling chamber 14 is enclosed at its sides by the side walls 26 and around its circumference by the baling elements 28. The baling elements 28 leave an inlet 30 at one location at the bottom in front through which harvested crop can be charged into the baling chamber 14 from the take-up drum 20. The wheels 16 support the chassis 12 or the entire harvesting machine 10 on the ground. The towbar 18 forms a connection between the chassis 12 and the towing vehicle 22 and extends in, general horizontally, above the take-up drum 20.

The take-up drum 20 is configured in the form of a so-called pick-up, that is, it is equipped with several rows of circulating resilient tines 32 which brush across the ground and thereby lift harvested crop lying on the ground and convey it to the rear into the inlet 30. The tines 32 may be fastened rigidly to a central rotor of the take-up drum 20 or their angular position relative to the take-up drum 20 can be controlled by cam tracks or other appropriate devices. In the arrangement shown—but which is not a requirement—conveyor rotors 34 are provided between the take-up drum 20 and the inlet 30.

The take-up drum 20 is arranged in known manner in a stand 48 that is fastened to the chassis 12, free to pivot, about a horizontal axis 26 extending transverse to the forward operating direction. The stand 48 of the take-up drum 20 is supported on the ground by support wheels 38 that are provided on both sides of the take-up drum 20 and that guide the take-up drum 20 at a constant height above the ground in a manner that copies the contour of the ground. A hold-down 40 is attached above the take-up drum 20, it is equipped with a roll 42, free to rotate, about its longitudinal axis that extends horizontally and transverse to the direction of operation, and that is used to limit the flow of the harvested crop taken up by the take-up drum 20 to the front and upward. In place of or in addition to the roll 42 the hold-down 40 may be provided with rigid or flexible guide vanes or guide vanes that can be pivoted (not shown). At its rear end the hold-down 40 is connected in joints to a retainer 46, free to pivot, about a horizontal axis 44 that extends transverse to the direction of operation, the retainer 46, in turn, is connected to the stand 48.

A first actuator 50 in the form of a single-acting hydraulic cylinder is arranged between the chassis 12 and the stand 48 of the take-up drum 20. If its piston chamber is provided with pressurized hydraulic fluid, then the stand 48 is pivoted along with the take-up drum 20 from the operating position shown in FIG. 1 upward about the axis 36 into a non-operating position (not shown), in order to be able to operate the harvesting machine 10 on public roads. A second actuator 52 in the form of a double-acting hydraulic cylinder is arranged between the stand 48 and the hold-down 40. If the piston chamber of the second actuator 52 is supplied with pressurized hydraulic fluid, then the hold-down 40 is raised with respect to the take-up drum 20 and the hold-down 40 is lowered with respect to the take-up drum 20 when the piston rod chamber of the second actuator 52 is supplied with pressurized hydraulic fluid. During the harvesting operation the second actuator 52 is located in its lowest possible position. Then the hold-down 40 follows the movement of the take-up drum 20 that is brought about by the support wheels 38, this movement is directed about the axis 36 and its spacing from the take-up drum 20 remains constant. In case of a jam in the take-up drum 20 or the inlet 30 the hold-down 40 can be raised by means of the second actuator 52 in order to simplify the reverse operation of the take-up drum 20 and/or the rotors 34 for the purpose of removing the jam. In another embodiment, not shown, the hold-down 40 is attached so that it can be slid in the vertical direction by the second actuator 52.

Differing from the configuration that is shown in FIG. 1, a second actuator 52 is provided on each side of the hold-down 40 as are two first actuators 50 that are provided on each side of the stand 48. At this point it should be noted that the support wheels 38 can be omitted if the first actuator 50 (or another appropriate actuator) performs an automatic control of the height of the take-up drum 20 by means of an appropriate sensor, as was described by DE 100 57 135 A whose disclosure is incorporated into the present document by reference.

Figure 2:
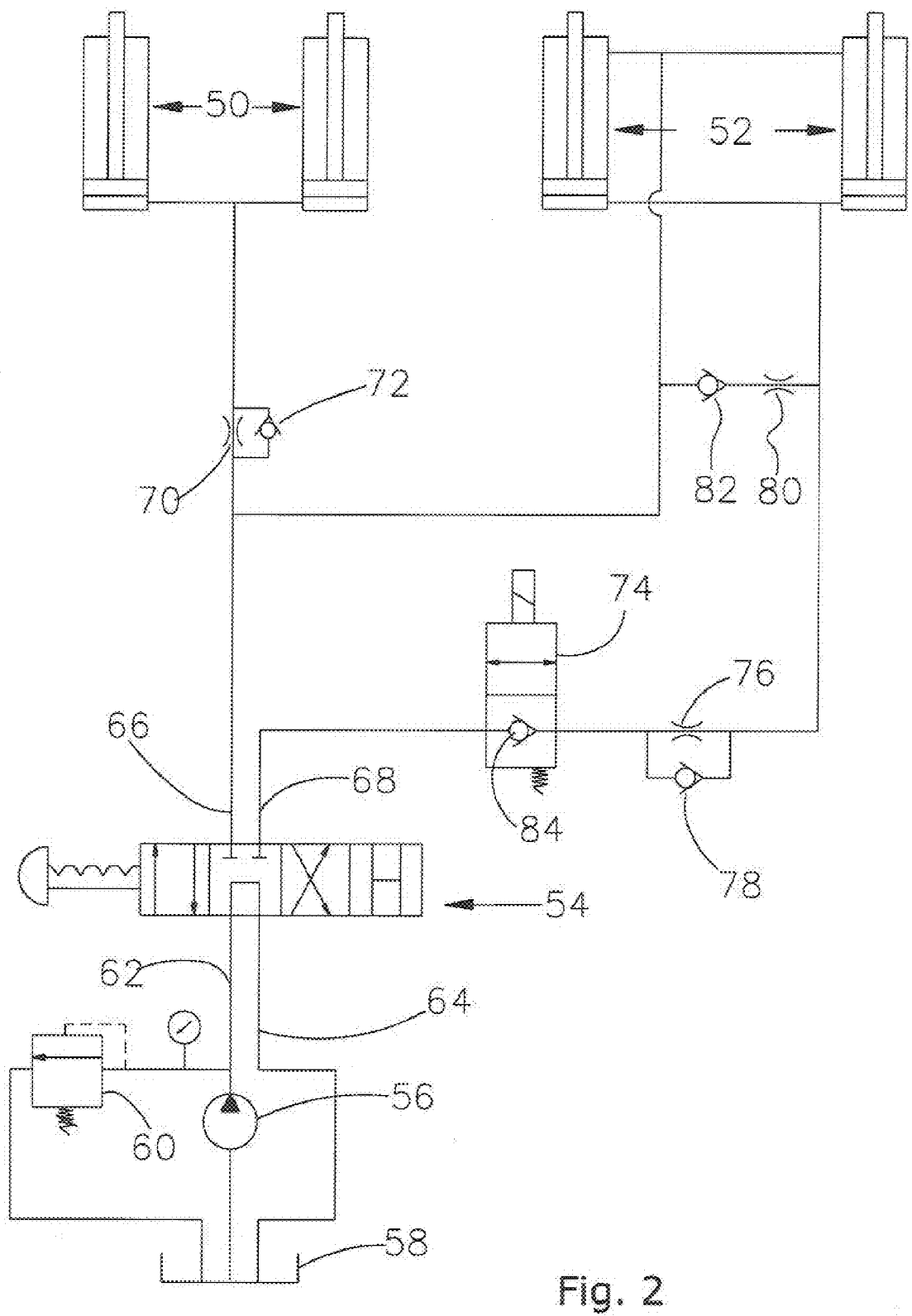
FIG. 2 is a hydraulic circuit diagram of the control arrangement.

FIG. 2 shows a hydraulic circuit diagram for the control arrangement for the control of the actuators 50, 52. It includes a selector-control valve 54 with two paths and four positions, that is located on board the towing vehicle 22 and that can be controlled manually or by means of external forces by the operator of the towing vehicle 22 from his operator's station. A first input 62 of the selector-control valve 54 is connected to a source 56 of pressurized hydraulic fluid, that is configured as a hydraulic pump and is connected on its part to a reservoir 58. A pressure limiting valve 60 limits the pressure of the source 56 to a desired value. A second input 64 of the selector-control valve 54 is connected with the reservoir 58. A first output 66 of the selector-control valve 54 is connected directly with the piston rod chamber of the second actuator 52 and over a throttle 70 with a check valve 72 that opens in the direction of the output 66 and is connected with the piston chamber of the first actuator 50. A second output 68 of the selector-control valve 54 is connected with the piston chamber of the second actuator 52 over a selector valve 74 with one path and two positions and a throttle 76 switched in series and a check valve 78 switched in parallel to the throttle 76 which opens in the direction of the output 68. The piston chamber and the piston rod chamber of the second actuator 52 are connected to each other by a throttle 80 with a check valve 82 switched in series thereto, which also could be omitted. The selector valve 74 includes a through position and a position in which a check valve 84 is effective that opens in the direction of the outlet 68. Preferably the selector valve 74 can be actuated by external forces by the operator from his operator station on the towing vehicle 22. As a rule it is located on board the harvesting machine 10, while the selector-control valve 54 is already provided in series production on board the towing vehicle 22.

Figure 3:
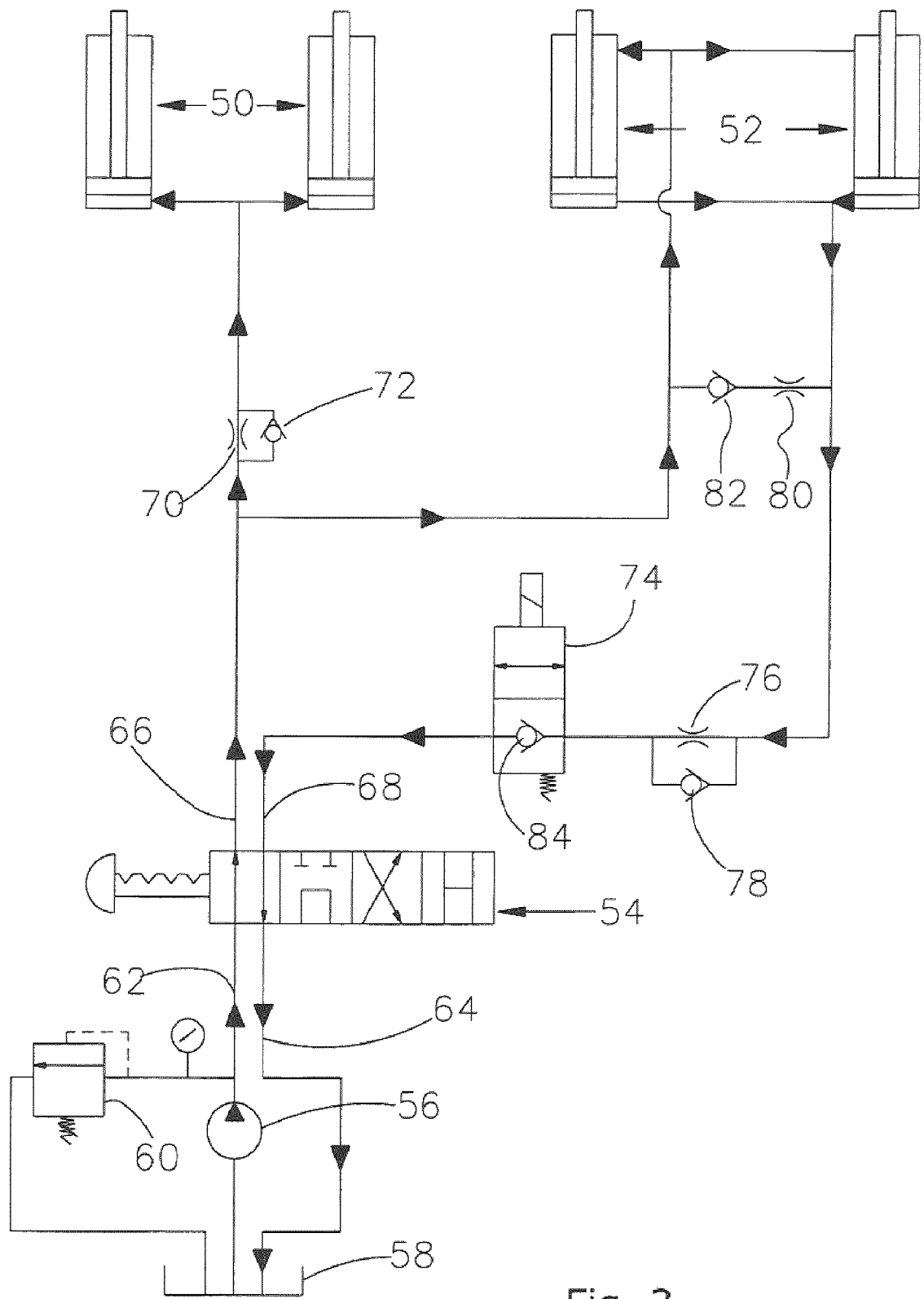
FIG. 3 is the hydraulic circuit diagram of FIG. 2 during the lifting of the take-up drum.

FIG. 3 shows the hydraulic circuit diagram of FIG. 2 in a position in which the selector-control valve 54 is located in a first through flow position, in which the take-up drum 20 is raised, while the selector valve 74 is in the blocking position. Accordingly the piston rod chambers of the actuators 52 are supplied with pressurized hydraulic fluid so that the hold-down 40 that may have been raised is lowered and the hydraulic fluid that was forced out of the piston chamber of the actuators 50 is moved through the throttle 76 and the check valve 84 to the reservoir 58. Moreover the piston chambers of the actuators 50 are supplied with pressurized hydraulic fluid through the throttle 70 so that the stand 48 with the take-up drum 20 is moved upward. The movement of the actuator 50 that was limited by the throttle 70 has the effect that the hold-down 40 has already been lowered before the take-up drum 20 has reached its non-operating position, which prevents a collision of the hold-down 40 with the towbar 18 or the chassis 12. The positions of the valves 54, 74 as shown in FIG. 2 are used, in particular, when the harvesting machine 10 has reached the end of a field and the take-up drum 20 must be raised before a turning process is initiated, or during an operation on public roads. The position of the valves 54, 74 has the effect that a hold-down 40 that may have been raised is lowered before the take-up drum 20 is raised. However the hold-down 40 is normally lowered during the harvesting operation so that the take-up drum 20 is raised immediately.

Figure 4:
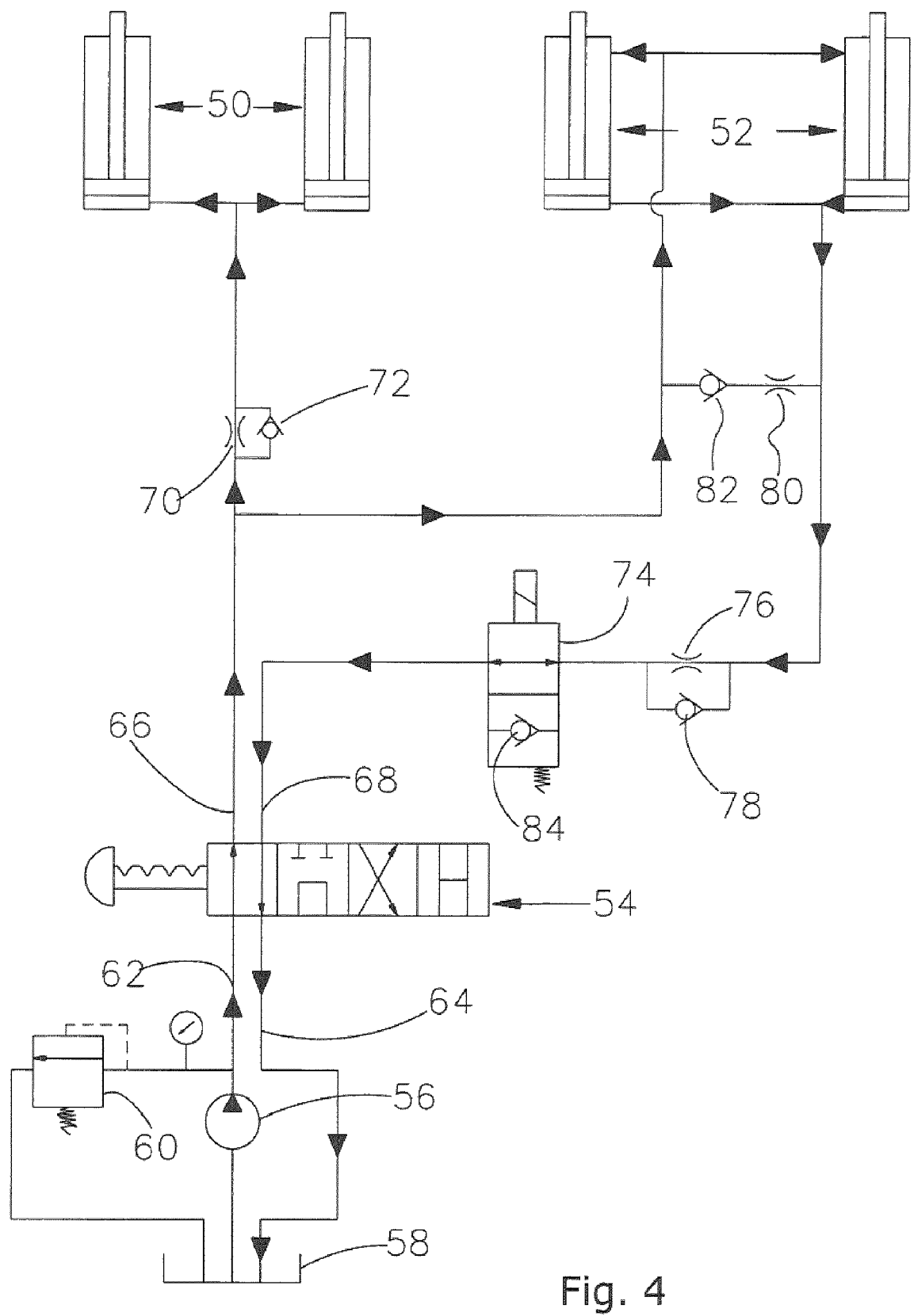
FIG. 4 is the hydraulic circuit diagram of FIG. 2 during the lifting of the take-up drum and the lowering of the hold-down.

FIG. 4 shows the hydraulic circuit diagram of FIG. 2 in a position in which the selector-control valve 54 is also located in the first through flow position in which the take-up drum 20 is raised while the selector valve 74 is now in the through flow position. Accordingly the piston chambers of the actuators 50 are supplied with pressurized hydraulic fluid through the throttle 70 so that they move the stand 48 with the take-up drum 20 upward. The piston rod chambers of the actuators 52 are also supplied with pressurized hydraulic fluid so that the hold-down 40 is lowered, and the hydraulic fluid forced out of the piston rod chambers of the actuators 50 is moved through the throttle 76 and the selector valve 84 to the reservoir 58, in particular with a velocity as in the position of FIG. 3. Due to the movement of the actuator 50 as limited by the throttle 70, the effect here is also that the hold-down 40 has already been lowered before the take-up drum 20 has reached its non-operating position, which avoids a collision of the hold-down 40 with the towbar 18 or the chassis 12. The position of the valves 54 and 74 according to FIG. 4 is used to lower the hold-down 40 which had been raised in order to remove a jam, if the take-up drum 20 is to be raised immediately following.

Figure 5:
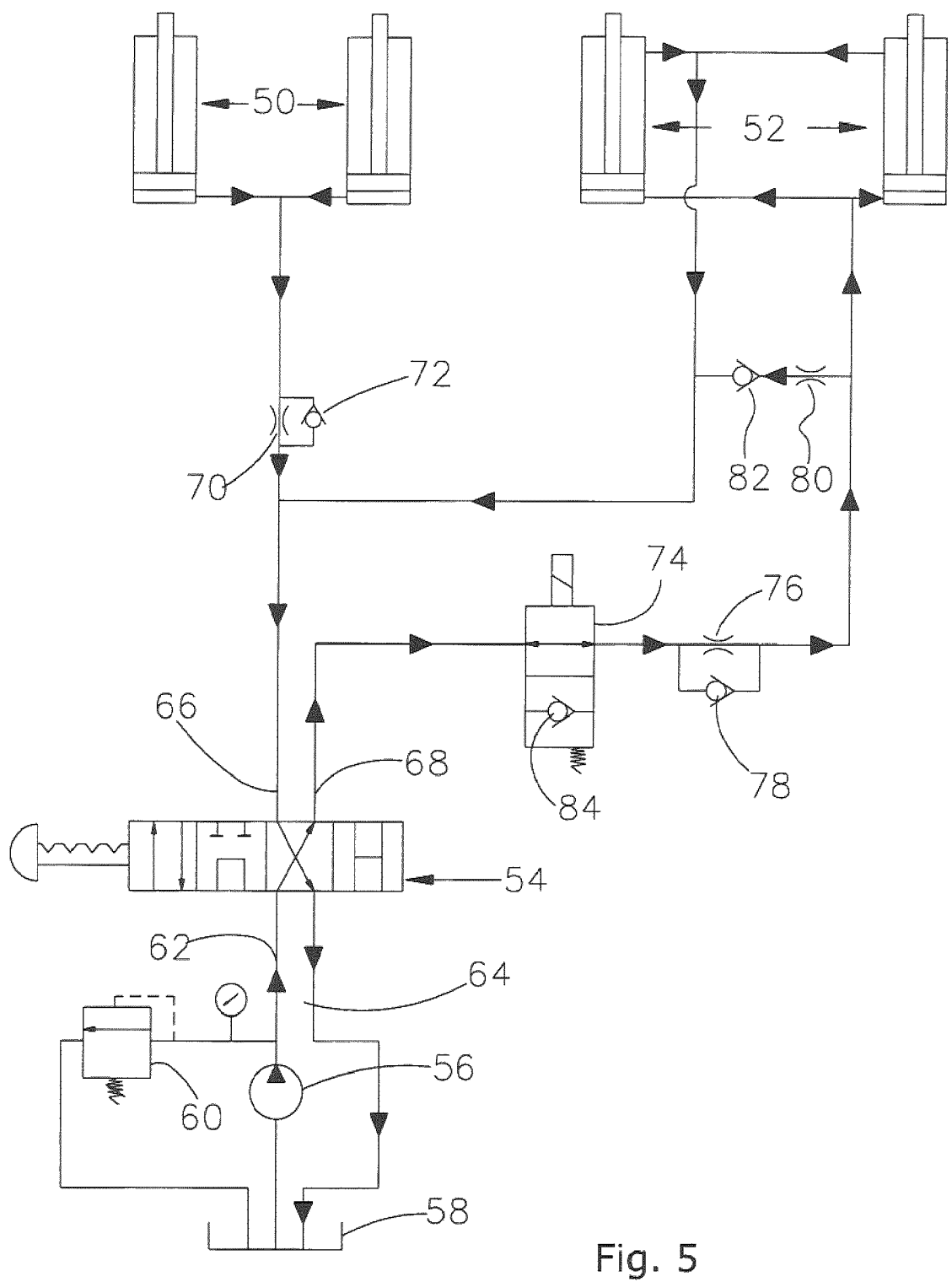
FIG. 5 is the hydraulic circuit diagram of FIG. 2 during the lowering of the take-up drum and the lifting of the hold-down.

FIG. 5 shows the hydraulic circuit diagram of FIG. 2 in a position in which the selector-control valve 54 is shown in a second through flow position in which the take-up drum 20 is lowered, while the selector valve 74 is shown in the through flow position. Accordingly the piston chambers of the actuators 50 are connected through the throttle 70 and the opening check valve 72 with the reservoir 58, so that the stand 48 with the take-up drum 20 moves downward due to the force of gravity and the hydraulic fluid is forced out of the piston chambers of the first actuators into the reservoir 58. Now the piston rod chambers of the actuators 52 are supplied with pressurized hydraulic fluid over the selector valve 74 and the throttle 76 so that the hold-down 40 is raised, and the hydraulic fluid forced out of the piston rod chambers of the actuators 52 is moved to the reservoir 58. If the hold-down 40 is in its highest position, then the pressure in the piston chamber of the actuators 50 is limited by the throttle 80 and the check valve 82. The positions of the selector valve 74 and the selector-control valve 54 as shown in FIG. 5 are appropriate for raising the hold-down 40 prior to a reverse operation or in order to draw jammed harvested crop slowly into the harvesting machine 10, which is simplified by the raised hold-down 40.

Figure 6:
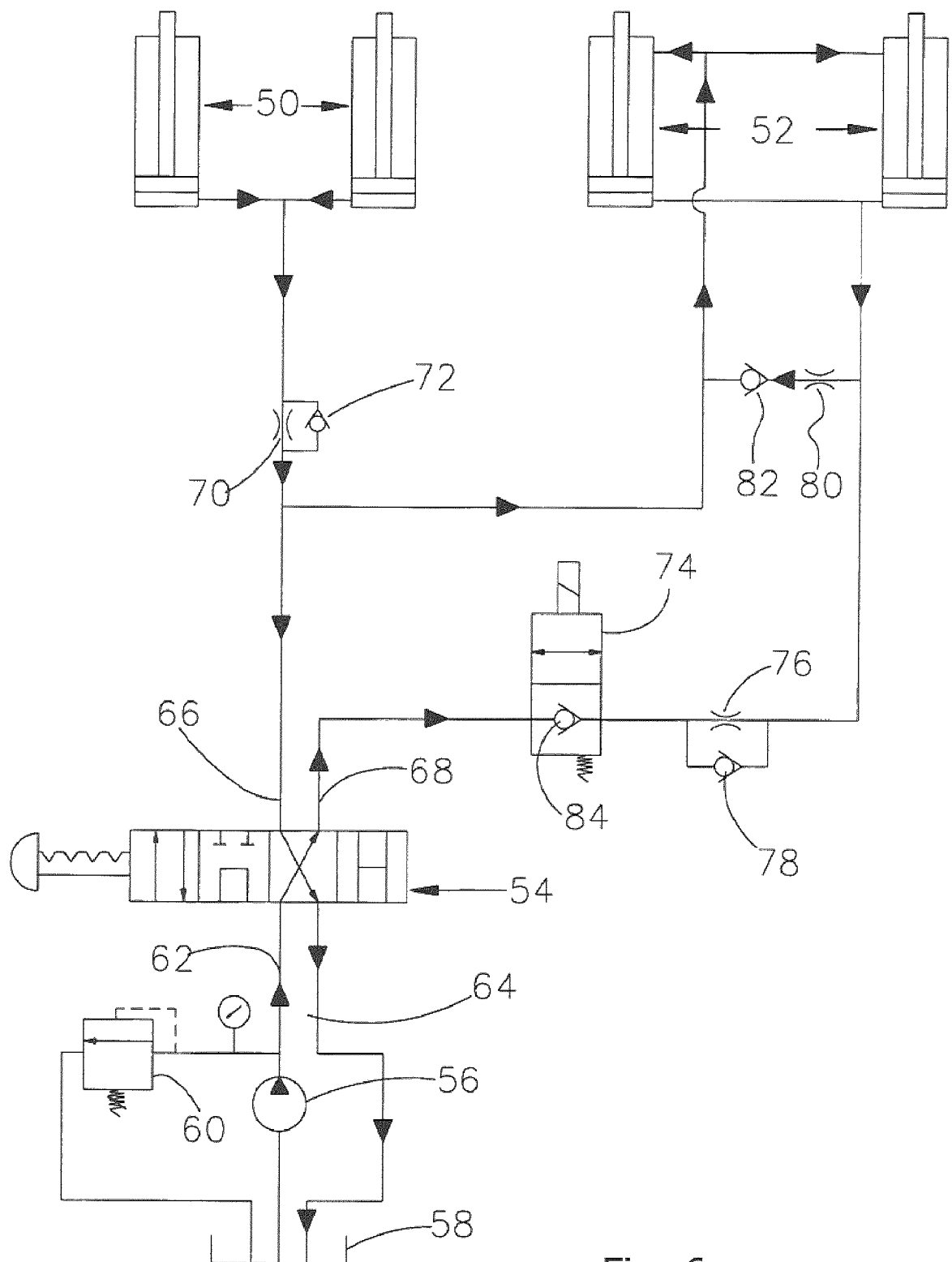
FIG. 6 is the hydraulic circuit diagram of FIG. 2 during the lowering of the take-up drum and the lowering of the hold-down; and, FIG. 7 is the hydraulic circuit diagram of FIG. 2 in a floating position.

FIG. 6 shows the hydraulic circuit diagram of FIG. 2 in a position in which the selector-control valve 54 is in the second through flow position in which the take-up drum 20 is lowered while the selector valve 74 is in its blocking position. Accordingly the piston chambers of the actuators 50 are connected with the reservoir 58 through the throttle 70 and check valve 72 that is opening, so that the stand 48 with the take-up drum 20 is moved downward on the basis of the force of gravity and forces the hydraulic fluid out of the piston chamber of the first actuators 50 into the reservoir 58. The hold-down 40 is lowered on the basis of the force of gravity so that hydraulic fluid flows out of the piston chamber of the second actuator 52 over the throttle 80 and the check valve 82 into the piston rod chamber of the second actuator 52. The positions of the selector valve 74 and the selector-control valve 54 shown in FIG. 6 are appropriate for lowering the hold-down 40 after a reverse operation or a slow retraction of jammed harvested crop while the hold-down 40 is raised.

Figure 7:
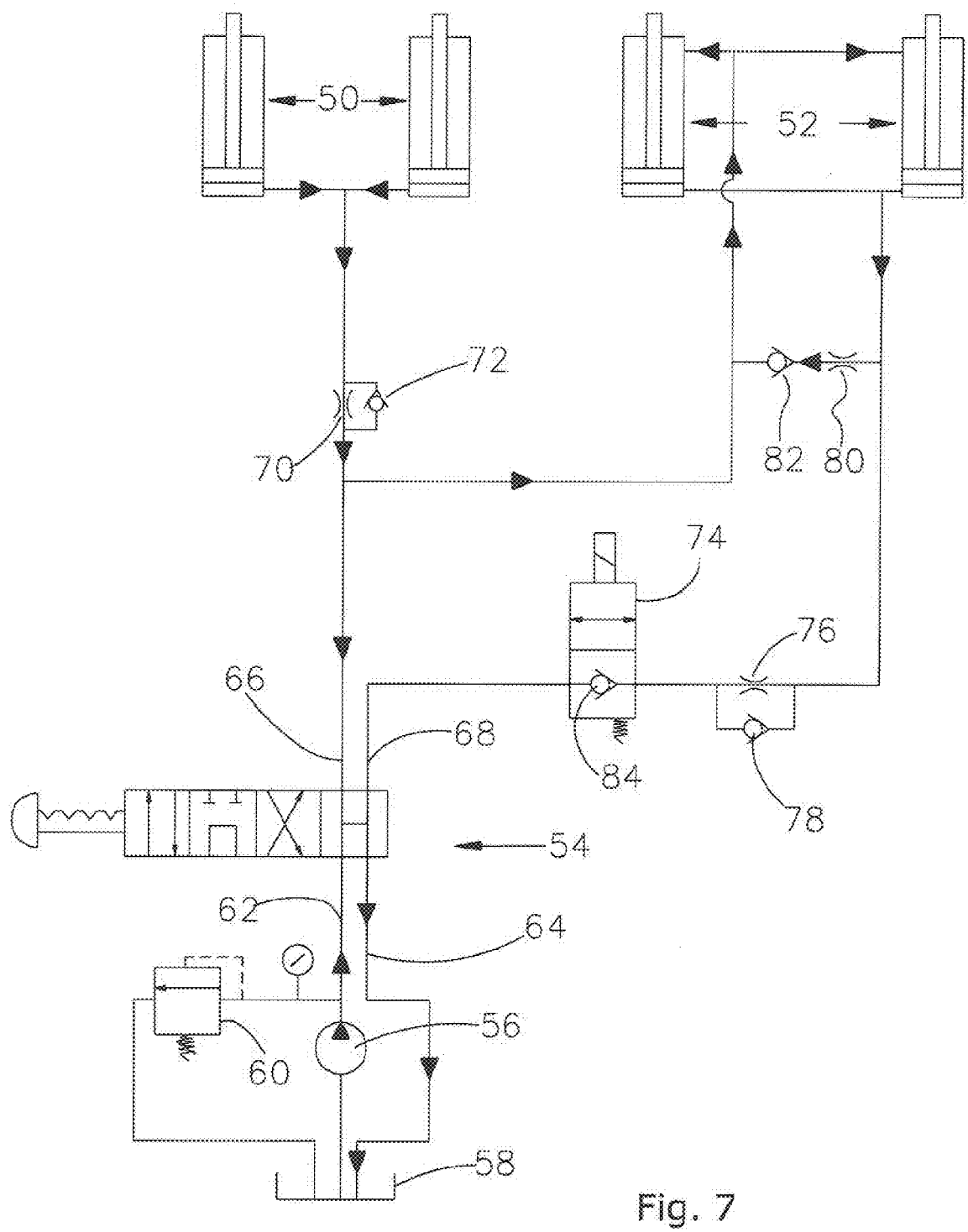

FIG. 7 shows the hydraulic circuit diagram of FIG. 2 in a position in which the selector-control valve 54 is in a throughflow position in which all inputs 62, 64 and all outputs 66, 68 are connected to each other, so that the take-up drum 20 is lowered while the selector valve 74 is in the blocking position. Accordingly the piston chamber of the actuators 50 are connected to the reservoir 58 through the throttle 70 and the opening check valve 72, so that the stand 48 with the take-up drum 20 moves downward on the basis of the force of gravity and forces the hydraulic fluid out of the piston chambers of the first actuators 50 into the reservoir 58. The hold-down 40 is lowered due to the force of gravity, so that hydraulic fluid reaches out of the piston chamber of the second actuator 52 over the throttle 80 and the check valve 82 into the piston rod chamber of the second actuator 52. The positions of the selector valve 74 and the selector-control valve 54 shown in FIG. 7 provide for a lowered position of the first actuators 50 and the take-up drum 20 and for the second actuators 52 and the hold-down 40, that is appropriate for normal harvesting operations.

Having described the preferred embodiment, it will become apparent that various modifications can be made without departing from the scope of the invention as defined in the accompanying claims.

The invention claimed is:

1. An arrangement for the adjustment of a position of a take-up drum and a position of a hold-down of an agricultural harvesting machine, the arrangement having a first actuator arranged for the movement of the take-up drum relative to the harvesting machine between an operating position and a non-operating position, a second actuator arranged for the adjustment in height of the hold-down relative to the take-up drum and a control arrangement connected with the first and second actuators, wherein when the control arrangement controls the first actuator to bring the take-up drum into the non-operating position the control arrangement also initiates the second actuator for the downward movement of the hold-down.

2. An arrangement according to claim 1, wherein the control arrangement controls the second actuator one of prior to, in time and simultaneously with the first actuator for the movement of the take-up drum into the non-operating position in the sense of a downward movement of the hold-down.

3. An arrangement according to claim 1, wherein the actuators are hydraulic cylinders and that the control arrangement includes a selector-control valve with two inputs and two outputs, the first input being connected with a line with pressurized hydraulic fluid, the second input being connected with a reservoir, the first output being connected over a throttle and a check valve in parallel with it, with a chamber of the first actuator supplied with pressurized hydraulic fluid for the raising of the take-up drum and being connected with a chamber of the second actuator for the lowering of the hold-down, over a selector valve and a throttle connected in series with it, with a check valve connected in parallel with the throttle, the second output being connected in series with its check valve connected to a chamber of the second actuator for the raising of the hold-down.

4. A harvesting machine having with an arrangement for the adjustment of a position of a take-up drum and a position of a hold-down of the agricultural harvesting machine having a first actuator arranged for the movement of the take-up drum relative to the harvesting machine between an operating position and a non-operating position, a second actuator arranged for the adjustment in height of the hold-down relative to the take-up drum and a control arrangement connected with the actuators, wherein when the control arrangement controls the first actuator to bring the take-up drum into the non-operating position the control arrangement also initiates the second actuator for the downward movement of the hold-down.

5. A harvesting machine according to claim 4, wherein the control arrangement controls the second actuator one of prior to, in time and simultaneously with the first actuator for the movement of the take-up drum into the non-operating position in the sense of a downward movement of the hold-down.

6. A harvesting machine according to claim 4, wherein the actuators are hydraulic cylinders and that the control arrangement includes a selector-control valve with two inputs and two outputs, the first input being connected with a line with pressurized hydraulic fluid, the second input being connected with a reservoir, the first output being connected over a throttle and a check valve in parallel with it, with a chamber of the first actuator supplied with pressurized hydraulic fluid for the raising of the take-up drum and being connected with a chamber of the second actuator for the lowering of the hold-down, over a selector valve and a throttle connected in series with it, with a check valve connected in parallel with the throttle, the second output being connected in series with its check valve connected to a chamber of the second actuator for the raising of the hold-down.

7. A harvesting machine according to claim 4, wherein the take-up drum is attached, free to pivot about a horizontal axis extending transverse to the direction of operation relative to a chassis of the harvesting machine and is guided in a manner copying the contour of the ground and the hold-down is arranged, relative to the take-up drum, to slide in height or free to pivot about a horizontal axis that extends transverse to the direction of operation.

8. A harvesting machine according to claim 4, wherein the harvesting machine is a towed baler and a towbar is attached above the hold-down.

* * * * *